United States Patent
Choi et al.

(10) Patent No.: US 10,019,660 B2
(45) Date of Patent: Jul. 10, 2018

(54) METHOD OF PRINTING USER FORM DOCUMENT, IMAGE FORMING APPARATUS USING THE METHOD, AND COMPUTER-READABLE RECORDING MEDIUM

(71) Applicant: S-PRINTING SOLUTION CO., LTD., Suwon-si (KR)

(72) Inventors: Chang-seok Choi, Suwon-si (KR); Seung-soo Oak, Seongnam-si (KR)

(73) Assignee: S-PRINTING SOLUTION CO., LTD., Suwon-Si (KR)

( * ) Notice: Subject to any disclaimer, the term of this patent is extended or adjusted under 35 U.S.C. 154(b) by 0 days.

(21) Appl. No.: 14/312,020

(22) Filed: Jun. 23, 2014

(65) Prior Publication Data
US 2015/0002901 A1     Jan. 1, 2015

(30) Foreign Application Priority Data
Jun. 27, 2013  (KR) .................. 10-2013-0074917

(51) Int. Cl.
| | | |
|---|---|---|
| *H04N 1/00* | (2006.01) | |
| *G06K 15/02* | (2006.01) | |
| *G06F 3/12* | (2006.01) | |

(52) U.S. Cl.
CPC ......... *G06K 15/027* (2013.01); *G06F 3/1208* (2013.01); *G06F 3/1229* (2013.01); *G06F 3/1256* (2013.01); *H04N 1/0005* (2013.01); *H04N 1/0009* (2013.01); *H04N 1/00015* (2013.01); *H04N 1/00031* (2013.01); *H04N 1/00045* (2013.01); *H04N 1/00066* (2013.01)

(58) Field of Classification Search
None
See application file for complete search history.

(56) References Cited

U.S. PATENT DOCUMENTS

| | | | |
|---|---|---|---|
| 6,042,278 A | 3/2000 | Spencer et al. | |
| 2002/0171863 A1* | 11/2002 | Sesek ................... | G06F 3/1205 358/1.15 |
| 2007/0086034 A1* | 4/2007 | Morton, III .......... | G06F 3/1207 358/1.13 |
| 2008/0010200 A1* | 1/2008 | Smith .................. | G06Q 20/105 705/41 |
| 2008/0055640 A1* | 3/2008 | Takahashi ............ | G06F 9/4411 358/1.15 |
| 2010/0053672 A1* | 3/2010 | Peng .................... | B41J 29/393 358/1.15 |
| 2011/0001995 A1* | 1/2011 | Sato ..................... | G06F 21/608 358/1.11 |
| 2011/0055209 A1* | 3/2011 | Novac .................. | G06F 17/211 707/737 |
| 2011/0286047 A1* | 11/2011 | Yabe .................... | 358/3.06 |

(Continued)

FOREIGN PATENT DOCUMENTS

KR     1998-084402     12/1998

*Primary Examiner* — Helen Zong
(74) *Attorney, Agent, or Firm* — Staas & Halsey LLP

(57) ABSTRACT

A method of storing data for a user form document received from the outside in an image forming apparatus, in place of a test page that has been stored in the image forming apparatus, and printing the user form document according to a command to print the test page, an image forming apparatus using the method, and a computer-readable recording medium.

18 Claims, 8 Drawing Sheets

(56) References Cited

U.S. PATENT DOCUMENTS

2012/0081749 A1\*   4/2012   Kitada .................... G06F 3/121
                                                          358/1.15
2012/0194860 A1\*   8/2012   Anno ..................... B41J 29/393
                                                          358/1.15

\* cited by examiner

METHOD OF PRINTING USER FORM DOCUMENT, IMAGE FORMING APPARATUS USING THE METHOD, AND COMPUTER-READABLE RECORDING MEDIUM

CROSS-REFERENCE TO RELATED APPLICATIONS

This application claims the priority benefit of Korean Patent Application No. 10-2013-0074917, filed on Jun. 27, 2013, in the Korean Intellectual Property Office, the disclosure of which is incorporated herein in its entirety by reference.

BACKGROUND

1. Field

One or more embodiments relate to a method of printing a user form document, an image forming apparatus using the method, and a computer-readable recording medium having recorded thereon a computer program for performing the method.

2. Description of the Related Art

An image forming apparatus, such as a printer and a multi-functional peripheral device, stores data regarding a test page to test whether a printed matter is exactly printed on paper. Advancements in science and technology have led to development of image forming apparatuses capable of printing high-quality printed matters. Thus, the amount of data regarding a test page used to test whether high-quality printed matter is to be exactly printed has increased in a memory included in the image forming apparatus.

A command to print a test page is set beforehand for each of various models of image forming apparatuses, in a predetermined manner. In general, a test page may be printed by manipulating a user interface of an image forming apparatus in a very simple manner.

SUMMARY

One or more embodiments of the present disclosure include a method of printing a user form document according to a command to print a test page, an image forming apparatus using the method, and a non-transitory computer-readable recording medium. Embodiments of the present disclosure are not, however, limited thereto and other various embodiments may be further derived from exemplary embodiments in the present disclosure.

In an aspect of one or more embodiments, there is provided a method of printing a user form document which includes storing data regarding a user form document received from the outside in an image forming apparatus, in place of data regarding a test page stored in the image forming apparatus; receiving a command to print the test page from a user via a user interface; loading the user form document based on the stored data regarding the user form document, in response to the command; and printing the loaded user form document.

In an aspect of one or more embodiments, there is provided a non-transitory computer-readable recording medium having recorded thereon a computer program causing a computer to perform the method of printing a user form document.

In an aspect of one or more embodiments, there is provided an image forming apparatus which includes a network interface for receiving data regarding a user form document from the outside; a memory for storing the received data regarding the user form document in place of data regarding a test page; a user interface for receiving a command to print the test page from a user; a control unit for loading the user format document based on the stored data regarding the user form document, in response to the command; and a print engine for printing the loaded user form document.

In an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
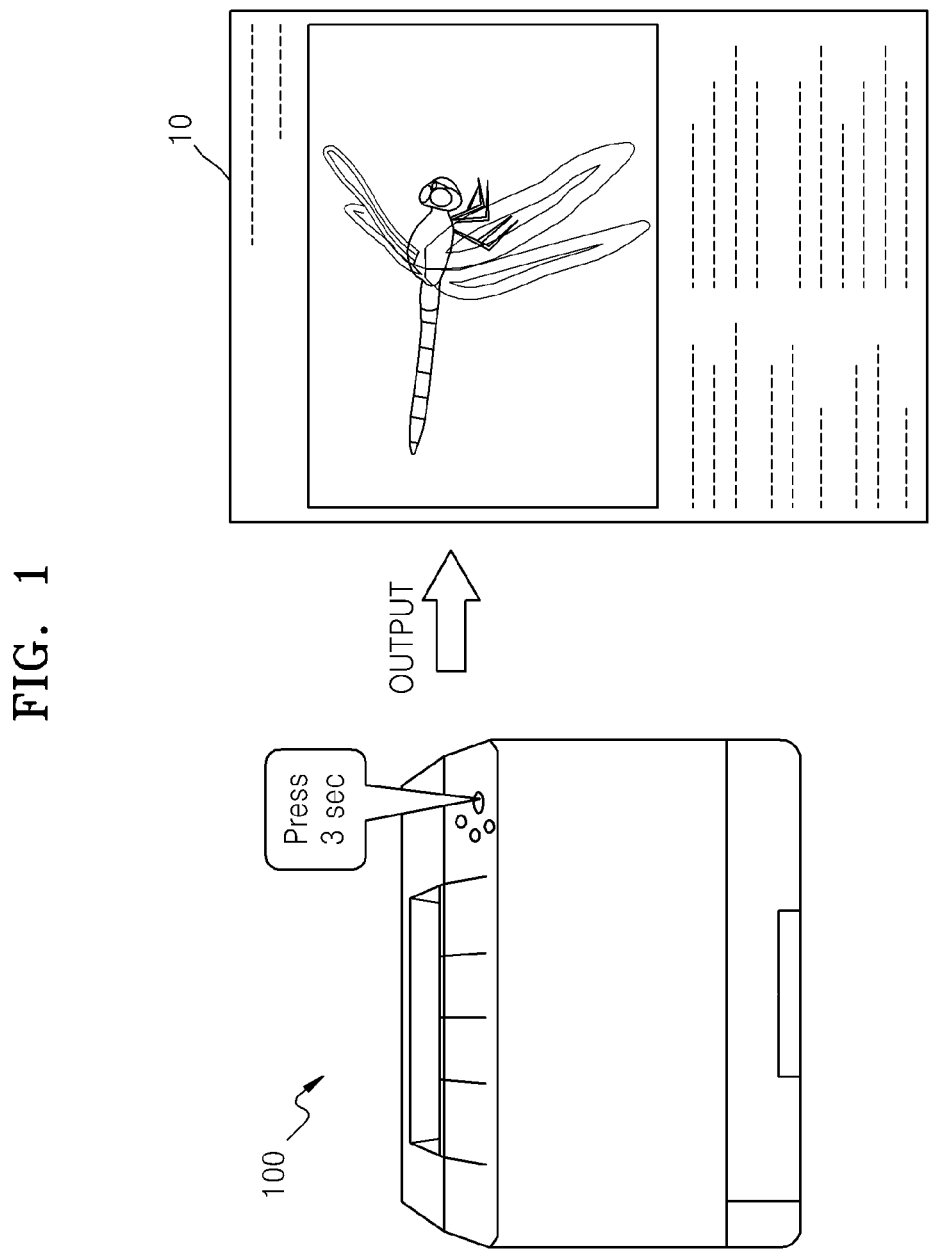
FIG. 1 is a diagram illustrating printing a test page by using an image forming apparatus.

Reference will now be made in detail to embodiments, examples of which are illustrated in the accompanying drawings, wherein like reference numerals refer to the like elements throughout. In this regard, embodiments may have different forms and should not be construed as being limited to the descriptions set forth herein. Accordingly, embodiments are merely described below, by referring to the figures, to explain aspects of the present disclosure. As used herein, the term "and/or" includes any and all combinations of one or more of the associated listed items.

Embodiments set forth herein relate to a method of printing a user form document and an image forming apparatus using the method. Hereinafter, matters that are well known to those of ordinary skill in the technical field to which the following embodiments belong are not described in detail.

FIG. 1 is a diagram illustrating printing a test page by using an image forming apparatus 100. The image forming apparatus 100 according to one or more embodiments may be one of various image forming apparatuses, such as a printer, a multi-functional peripheral device, a copy machine, a facsimile machine, a scanner, etc.

The image forming apparatus 100 stores data regarding a test page 10 in a partial space in a memory (not shown) therein to test whether a printed matter is exactly printed on paper. The test page 10 denotes a printed matter that is printed to test whether the image forming apparatus 100 is in a state of capable of performing printing before a print job is actually performed.

In order to print the test page 10, a user of the image forming apparatus 100 may input a command to print the test page 10 by manipulating a user interface (not shown) included in the image forming apparatus 100. The command to print the test page 10 may be input by appropriately selecting menus from a manual displayed on the user interface but may also be input by manipulating the user interface in an easier and more convenient manner. For example, as illustrated in FIG. 1, the user may output the test page 10 by pressing a 'feed' button for three seconds or more. That is, the test page 10 may be output from the image forming apparatus 100 according to a simple manner that is preset as a shortcut.

In the image forming apparatus 100, a simple user interface manipulation method is previously set as a shortcut for outputting the test page 10. However, an input manner of a shortcut for outputting the test page 10 may vary according to the model of the image forming apparatus 100.

As illustrated in FIG. 1, the command to print the test page 10 may be input to the image forming apparatus 100 by pressing a specific button among buttons that constitute the user interface for a specific time or by pressing the specific button a specific number of times. For example, the command to print the test page 10 may be input to the image forming apparatus 100 by pressing the 'feed' button five times.

Alternatively, the command to print the test page 10 may be input to the image forming apparatus 100 by simultaneously or consecutively pressing at least two buttons among the buttons that constitute the user interface. For example, the image forming apparatus 100 may print the test page 10 by simultaneously pressing a 'cancel' button and a 'copy' button or consecutively pressing the 'feed' button while a 'power' button is pressed. Also, the command to print the test page 10 may be input to the image forming apparatus 100 by moving a part of the image forming apparatus 100 while manipulating the user interface. For example, the image forming apparatus 100 may be caused to print the test page 10 by opening and closing a dust cover of the image forming apparatus 100 while a specific button among the buttons that constitute the user interface is pressed. However, the command to print the test page 10 according to embodiments is not limited to the methods described above, and the command to print the test page 10 may be input via other various manners that match the model of the image forming apparatus 100.

Figure 2:
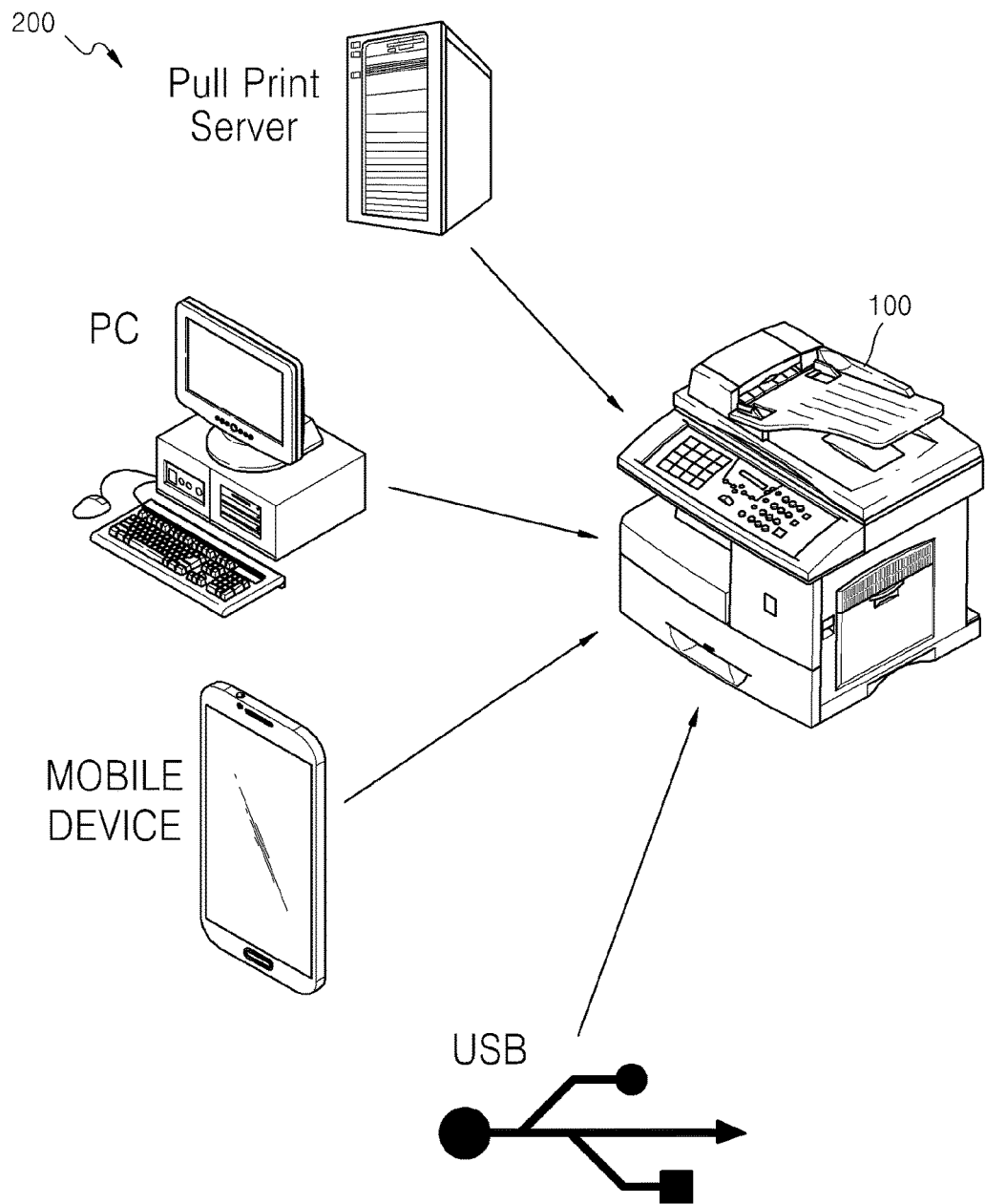
FIG. 2 is a diagram illustrating an image forming system including an image forming apparatus and external devices connected to the image forming apparatus.

FIG. 2 is a diagram illustrating an image forming system including an image forming apparatus 100 and external devices 200 connected to the image forming apparatus 100. The external devices 200 are various electronic devices that are installed outside the image forming apparatus 100 and that are capable of communicating with the image forming apparatus 100. For example, the external devices 200 may be a pull print server, a personal computer (PC), a mobile device, a universal serial bus (USB), etc., as illustrated in FIG. 2.

The image forming apparatus 100 may establish communication with the external devices 200. One image forming apparatus 100 may establish communication with the external devices 200 as illustrated in FIG. 2. The image forming apparatus 100 may establish communication with the external device 200 in a wired/wireless manner. For example, the image forming apparatus 100 may establish communication with the external devices 200 according to any of various communication manners, e.g., near field communication (NFC), Wi-Fi, Zigbee, Bluetooth, Wi-Fi direct, etc. The image forming apparatus 100 may exchange data with the external devices 200 according to any of such various communication manners.

Figure 3:
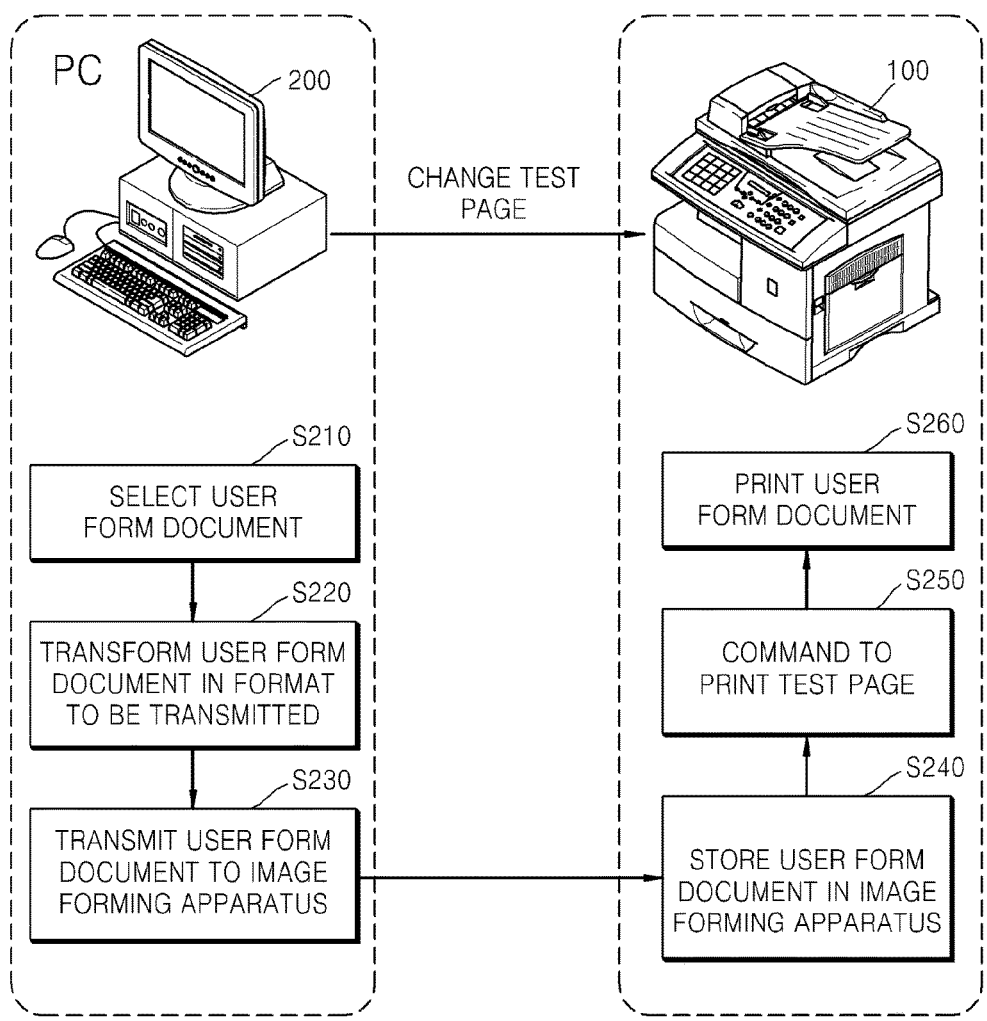
FIG. 3 is a diagram illustrating a whole process of printing a user form document transmitted from an external device by using an image forming apparatus according to one or more embodiments.

FIG. 3 is a diagram illustrating a whole process of printing a user form document 200 transmitted from an external device by using an image forming apparatus 100 according to one or more embodiments. As described above with reference to FIG. 2, the image forming apparatus 100 may exchange data with the external devices 200 by establishing communication with the external devices 200. The image forming apparatus 100 according to one or more embodiments may receive data regarding the user form document from the external device 200. In one or more embodiments, the data regarding the user form document may be either the user form document itself or information regarding a location at which the user form document is stored. That is, the external devices 200 may transmit either the user form document or the information regarding the location at which the user form document is stored to the image forming apparatus 100. The user form document may be any document that the user of the image forming apparatus 100 may print using the image forming apparatus 100. Examples of the user form document may include a written estimate, a contract, a subscription application form, etc. The information regarding the location at which the user form document is stored may be a document storage path of the external devices that may communicate with the image forming apparatus 100 or a uniform resource locator (URL) of a network to which the image forming apparatus 100 is linked.

FIG. 3 illustrates a whole process of printing a user form document according to one or more embodiments, in which the user form document is transmitted to the image forming apparatus 100 from the external device 200 and the image forming apparatus 100 receives the user form document and prints it according to a command given from a user. Specifically, a personal computer (PC) which is one of the external devices 200 may select a user form document (operation S210) that the user has frequently printed using the image forming apparatus 100, convert the user form document into a format to be transmitted to the image forming apparatus 100 (operation S220), and transmit the user form document to the image forming apparatus 100 (operation 230). The image forming apparatus 100 receives and stores the user form document transmitted from the PC that is one of the external devices 200 (operation S240). In one or more embodiments, the image forming apparatus 100 may store the user form document in a specific storage space therein. For example, the user form document may be stored in a test page storing space divided from a memory of the image forming apparatus 100, in place of the test page 10. In other words, the test page 10 is replaced with the user form document. In one or more embodiments, when the user of the image forming apparatus 100 inputs a command to print the test page 10 via the user interface (operation S250), the resultant user form document stored in the test page storing space may be printed using the image forming apparatus 100 (operation S260). A process of printing the user form document transmitted from the external device 200 using the image forming apparatus 100 will now be described in greater detail with reference to FIGS. 4 and 5.

Figure 4:
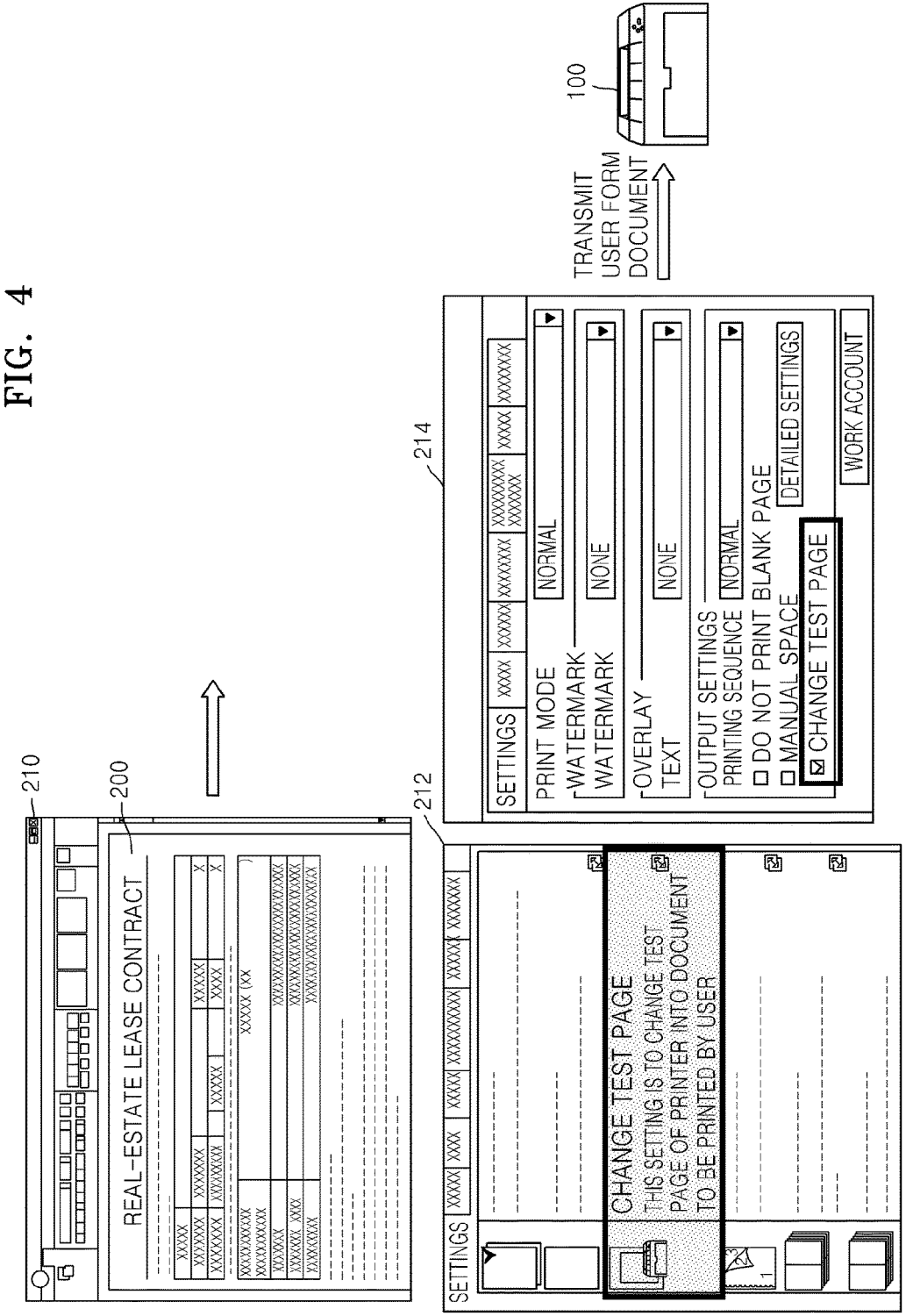
FIG. 4 is a diagram illustrating a process of transmitting a user form document to an image forming apparatus from an external device via a user interface according to one or more embodiments.

FIG. 4 is a diagram illustrating a process of transmitting a user form document 20 to an image forming apparatus 100 from an external device 200 via a user interface 210 according to one or more embodiments.

A user may select and display the user form document 20 by using the user interface 210 of the external device 200. The user may run a word processing program in the external device 200, select the user form document 20, and display the user form document 20 on the user interface 210. The user may transmit the user form document 20 to the image forming apparatus 100 by using the word processing program. For example, the user may bring up a print menu setting window 212 in the word processing program, access a particular attribute setting window 214, set an output setting to the image forming apparatus 100 to a 'change test page' mode, and then issue a print command, as illustrated in FIG. 4. Since the output setting to the image forming apparatus 100 is set to the 'change test page' mode, the image forming apparatus 100 does not actually perform printing even if a 'print' button is pressed in the word processing program to give a print command. In one or more embodiments, the user form document 20 is transmitted to the image forming apparatus 100 so that the user form document 20 may be stored in the image forming apparatus 100 in place of a test page stored in the image forming apparatus 100.

Figure 5:
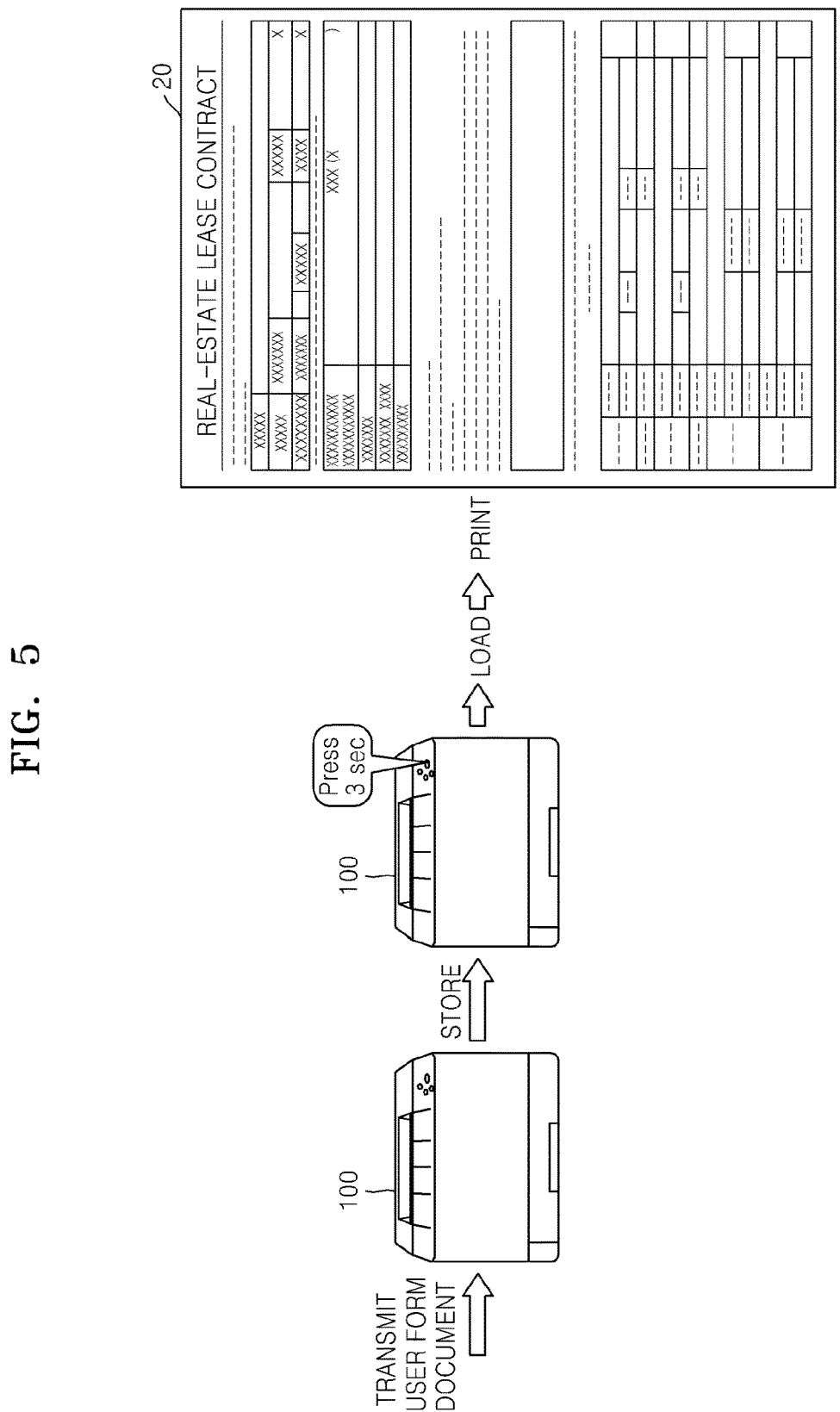
FIG. 5 is a diagram illustrating a process of printing a user form document transmitted from an external device by using an image forming apparatus according to one or more embodiments.

FIG. 5 is a diagram illustrating a process of printing a user form document 20 transmitted from an external device 200, by using an image forming apparatus 100 according to one or more embodiments.

When the user form document 20 is transmitted from the external device 200 to the image forming apparatus 100, the image forming apparatus 100 stores the received user form document 20 therein. In one or more embodiments, as described above with reference to FIG. 4, since a user has set an output setting to the image forming apparatus 100 to the 'change test page' mode, the user form document 20 is stored in the image forming apparatus 100 in place of a test page stored in the image forming apparatus 100. That is, the test page stored in the image forming apparatus 100 is replaced with the user form document 20 received by the image forming apparatus 100.

A command to print the test page has been preset in the image forming apparatus 100, and the image forming apparatus 100 prints printed matter stored as the test page when the command to print the test page is input thereto from a user. That is, the command to print the test page does not vary according to the type of the printed matter stored as the test page and is preset for the image forming apparatus 100. Thus, the printed matter stored as the test page is printed regardless of whether the printed matter is actually the test page or not. In other words, when the user form document 20 received from the image forming apparatus 100 is stored in a test page storing space in a memory in which the test page 10 has been stored, the image forming apparatus 100 considers the stored user form document 20 as the printed matter stored as the test page.

Then, when the user inputs the command to print the test page via the user interface, the user form document 20 is loaded and printed on paper in place of the test page 10.

FIGS. 3 to 5 illustrate a process in which the image forming apparatus 100 receives and prints the user form document 20 according to a command from a user when the external device 200 transmits the user form document 20 to the image forming apparatus 100. Alternatively, the external device 200 may transmit information regarding the location at which the user form document 20 has been stored to the image forming apparatus 100. In one or more embodiments, the image forming apparatus 100 may receive the information regarding the location at which the user form document 20 has been stored, and obtains and prints the user form document 20 from the location at which the user form document 20 has been stored according to the command from a user.

Figure 6:
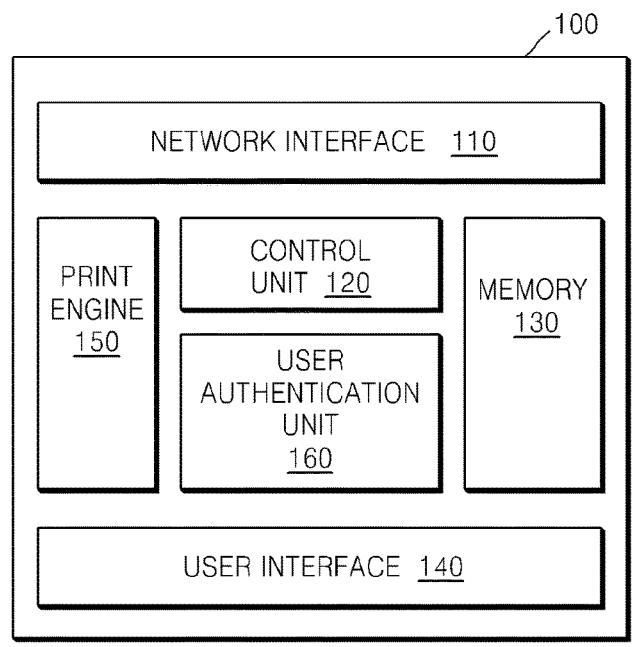
FIG. 6 is a block diagram of an image forming apparatus according to one or more embodiments.

FIG. 6 is a block diagram of an image forming apparatus 100 according to one or more embodiments. The image forming apparatus 100 may include a network interface 110, a control unit (controller) 120, a memory 130, a user interface 140, a print engine 150, and a user authentication unit (user authenticator) 160. It would be apparent to those of ordinary skill in the technical field to which the present embodiments pertain that the image forming apparatus 100 may further include other general elements in addition to the elements illustrated in FIG. 6.

The network interface 110 receives data regarding the user form document 20 from the outside. Data regarding the user form document 20 may be received periodically from the outside via the network interface 110. The data regarding the user form document 20 may be stored in the memory 130 under control of the control unit 120.

The control unit 120 controls overall operations of the image forming apparatus 100. The control unit 120 controls the image forming apparatus 100 according to a user command input via the user interface 140. The control unit 120 may load the user form document 20 to the memory 130 based on the data regarding the user form document 20 stored in place of the test page 10, according to a command to print the test page 10 input via the user interface 140. In one or more embodiments, the control unit 120 may load some content of the user form document 20 based on information generated in the image forming apparatus 100. For example, the information generated in the image forming apparatus 100 may be time information generated from a real time clock (RTC). When the time information is included in the user form document 20, the control unit 120 may load the content based on the time information generated from the RTC when the user form document 20 is loaded.

The memory 130 may store the data regarding the user form document 20 received via the network interface 110 in place of the data regarding the test page 10. That is, the memory 130 may store the user form document 20 in place of the test page 10 or may store the information regarding the location at which the user form document 20 has been stored in place of information regarding a location at which the test page 10 has been stored. The memory 130 will be described in detail with reference to FIG. 7 below.

Figure 7:
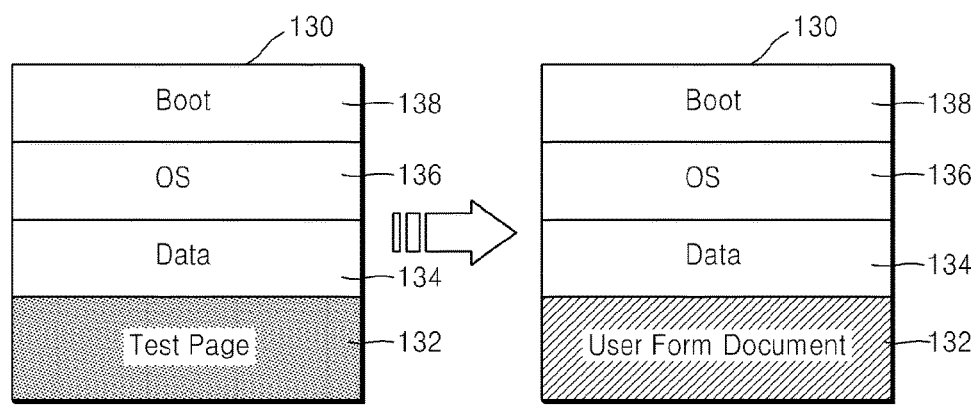
FIG. 7 is a diagram illustrating the structure of an internal memory of an image forming apparatus according to one or more embodiments.

FIG. 7 is a diagram illustrating the structure of a memory 130 included in an image forming apparatus 100 according to one or more embodiments. A left part of FIG. 7 illustrates a state in which data regarding a test page has been stored in the memory 130 before data regarding a user form document is stored therein. A right part of FIG. 7 illustrates a state in which the data regarding the user form document is stored in the memory 130 in place of the data regarding the test page.

As illustrated in FIG. 7, the memory 130 may divide and store data in data storage spaces defined therein beforehand in the memory 130, according to the types of the data. Boot data used to boot the image forming apparatus 100, operating system data used to manage the image forming apparatus 100, general data used to operate the image forming apparatus 100, and the data regarding the test page used to print the test page may be classified and stored in the respective data storage spaces as illustrated in the left part of FIG. 7, respectively. As shown in FIG. 7 the memory 130 may include test page storing space 132, data storing space 134, operating system storing space 136, and boot storing space 138. In one or more embodiments, the higher the performance of the image forming apparatus 100, the larger the test page storing space 132 of the memory 130 in which the data regarding the test page used to print the test page is stored. This is because as the performance of the image forming apparatus 100 is higher, the resolution of the test page used to test the performance of the image forming apparatus 100 is also higher.

However, the test page is used to determine whether the image forming apparatus 100 is installed normally only when the image forming apparatus 100 is first installed and operated or is reinstalled. The test page is not used when a general print job is performed after the installation of the image forming apparatus 100 is completed normally. Thus, the higher the performance of the image forming apparatus 100, the larger the test page storing space 132 occupied in the memory 130. However, after the installation of the image forming apparatus 100 is completed normally, the test page storing space 132 divided from the memory 130 is not actually used. Accordingly, some resources in the image forming apparatus 100 cannot be used.

According to one or more embodiments, the data regarding the user form document is stored (in place of the data regarding the test page 10) in the test page storing space 132 that is not actually used after the installation of the image forming apparatus 100 is completed normally. Thus, the test page storing space 132 may be used during a general print job. Accordingly, waste of resources occupied by the test page 10 in the memory 130 in the image forming apparatus 100 may be prevented, and the test page storing space 132 that was not actually used after normal installation of the image forming apparatus 100 become available. Thus, one or more embodiments may be performed by directly using resources of the memory 130 and the user interface 140 included in the image forming apparatus 100 to minimize hardware costs and by changing only software employed in the image forming apparatus 100. In other words, one or more embodiments may be applied to general image forming apparatuses.

Referring back to FIG. 6, the user interface 140 may receive a command to operate the image forming apparatus 100 from a user of the image forming apparatus 100. The user interface 140 may be embodied in any of various forms such as a touch panel, a button, etc., and may display information regarding an operation of the image forming apparatus 100 to the user or receive a command from the user. For example, the user may input a command to print the test page by using a touch panel or at least one button.

The user of the image forming apparatus 100 may input a command to control an operation of the image forming apparatus 100 by manipulating the user interface 140 of the image forming apparatus 100. The command may be input by appropriately selecting menus from a manual displayed on the user interface 140 or manipulating the user interface 140 in a simpler and more convenient way than the method described above. That is, a user command may be input according to a simple way that has been set as a shortcut in the image forming apparatus 100.

To print the test page, the user of the image forming apparatus 100 may input a command by appropriately selecting menus from the manual displayed on the user interface 140 or according to a simple way that has been set as a shortcut. For example, the image forming apparatus 100 may include the user interface 140 including a touch panel and additional buttons via which information regarding an operation of the image forming apparatus 100 is displayed to the user and an input is selected by the user. The user of the image forming apparatus 100 may input a command to print the test page by selecting appropriate menus from the manual displayed on the touch panel or using the buttons installed separately from the touch panel according to a simple manner that has been set as a shortcut. According to one or more embodiments, when data regarding the user form document that the user has frequently used is stored in the test page storing space 132 in the memory 130, the user form document 20 may be easily printed in a simple manner that has been set as a shortcut, according to the command to print the test page. That is, the user form document that the user desires to print may be easily printed by manipulating the user interface 140 that is simple to use but is not actually frequently used, thereby increasing the user's convenience.

The print engine 150 may print print data loaded from the memory 130 under control of the control unit 120. For example, when the control unit 120 loads the user form document 20 stored in the test page storing space 132 from the memory 130, the print engine 150 may print the loaded user form document 20.

The user authentication unit 160 authenticates the user of the image forming apparatus 100. In general, since the image forming apparatus 100 may be used by several users, some printing jobs may require user authentication. For example, when printed matter that is to be printed by the image forming apparatus 100 is a private document that should not be open to other users, a password may be set in the image forming apparatus 100 so that the other users cannot access the printed matter stored in the image forming apparatus 100 and only users who can exactly input the password are allowed to access this document. Also, when the user form document 20 is stored in the test page storing space 132 in the memory 130 as in one or more embodiments, modifying the user form document 20 should be restricted to only the owner of the image forming apparatus 100. That is, a user authentication process may be performed using a password or unique identification (ID) information so that only a specific person is given a right to access the test page storing space 132 in the memory 130 of the image forming apparatus 100. In one or more embodiments, the memory 130 may store the data regarding the user form document 20 in the test page storing space 132 in the memory 130 only when user authentication succeeds.

Figure 8:
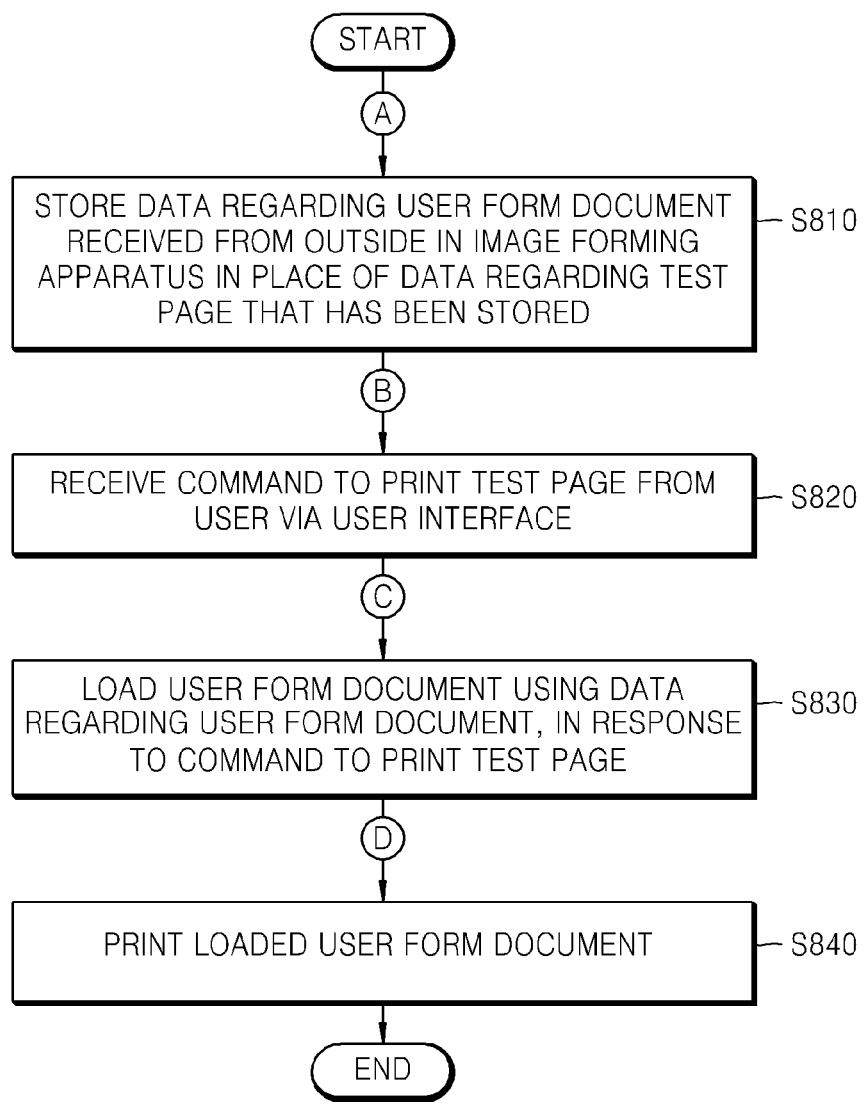
FIG. 8 is a flowchart illustrating a method of printing a user form document according to one or more embodiments.

FIG. 8 is a flowchart illustrating a method of printing a user form document according to one or more embodiments. Although not described here, the above description regarding the image forming apparatus 100 may also be applied to the method of printing the user form document according to the current embodiment.

Data regarding the user form document received from the outside is stored in the image forming apparatus 100 in place of data regarding a test page that has been stored in the image forming apparatus 100 (operation S810). For example, the data regarding the user form document may be stored in the test page storing space 132 divided from the memory 130 of the image forming apparatus 100. The storing of the data regarding the user form document (operation S810) will now be described in detail with reference to FIG. 9 below.

Figure 9:
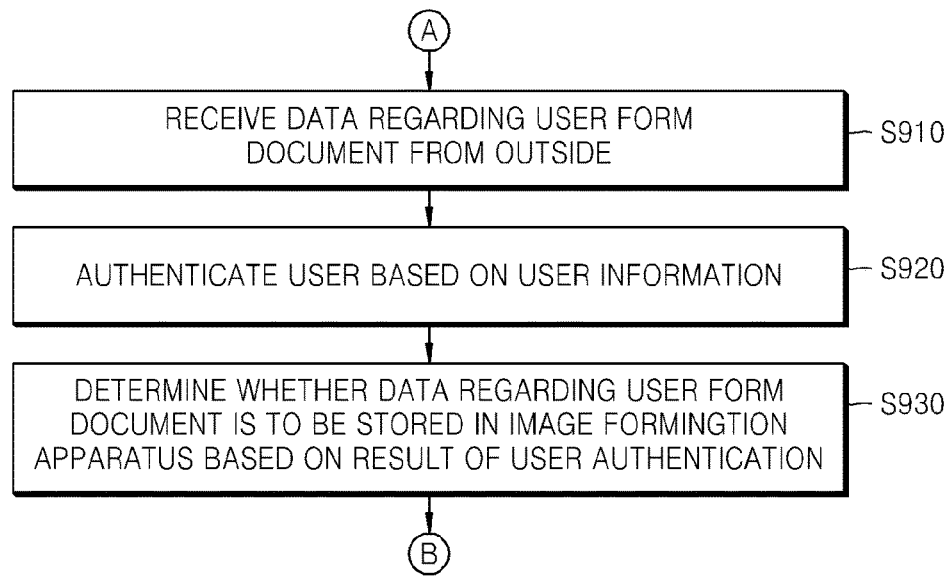
FIG. 9 is a detailed flowchart illustrating a process of storing data regarding a user form document in a test page storing space according to one or more embodiments.

FIG. 9 is a detailed flowchart illustrating storing of the data regarding the user form document in the test page storing space 132.

First, the network interface 110 of the image forming apparatus 100 receives the data regarding the user form document from the outside (operation S910). That is, a request to replace a test page stored beforehand in the image forming apparatus 100 with the user form document is received from the external device 200 located outside the image forming apparatus 100. Data regarding the user form document may be periodically received from the outside.

Then, the user authentication unit 160 of the image forming apparatus 100 authenticates a user based on user information (operation S920). The user information may be received together with the data regarding the user form document 20 when the data regarding the user form document 20 is received from the outside or may be directly input from the user via the user interface 140 of the image forming apparatus 100. The authentication of the user may be performed simultaneously with, before, or after the receiving of the data regarding the user form document 20 (operation S910). By authenticating the user, whether the user of the image forming apparatus 100 has a right to change the test page 10 may be determined, and a right to store and use the user form document in place of the test page may be restricted to the authenticated user.

Based on a result of authenticating the user, it is determined whether the received data regarding the user form document 20 is to be stored in the image forming apparatus 100 (operation S930). When the user authentication succeeds, the data regarding the user form document is stored in image forming apparatus 100. That is, the data regarding the test page that has been stored is replaced with the received data regarding the user form document. When the user authentication fails, the received data regarding the user form document is not stored in the image forming apparatus 100 and the data regarding the test page is not changed. The following operations will be described below, based on an assumption that the received data regarding the user form document is stored in the image forming apparatus 100.

Referring back to FIG. 8, a command to print the test page is input from a user via the user interface 140 (operation S820). Since the data regarding the user form document received from the outside is stored in the image forming apparatus 100 in place of the data regarding the test page, the command to print the test page is considered as a command to print the user form document. In other words, the command to print the test page may be directly used to actually instruct to print the user form document.

Then, the user form document is loaded using the data regarding the user form document stored in the image forming apparatus 100, in response to the command to print the test page input from the user (operation S830). The loading of the user form document using the data regarding the user form document (operation S830) will now be described in detail with reference to FIG. 10.

Figure 10:
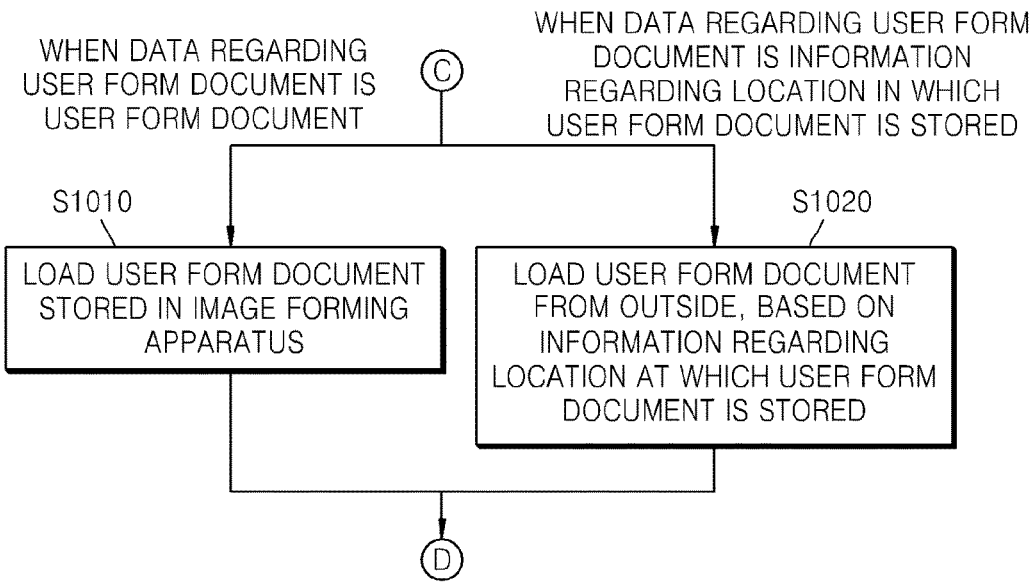
FIG. 10 is a detailed flowchart illustrating a process of loading a user form document using data regarding the user form document according to one or more embodiments.

FIG. 10 is a detailed flowchart illustrating loading of the user form document using data regarding the user form document according to one or more embodiments. The data regarding the user form document stored in the image forming apparatus 100 may be the user form document or information regarding a location at which the user form document is stored. That is, the user form document or the information regarding the location at which the user form document is stored may be stored in the image forming apparatus 100 as the data regarding the user form document. These two cases will now be individually described.

When the data regarding the user form document is the user form document, the control unit 120 loads the stored user form document (operation S1010). That is, when the user form document, such as a written estimate, a contract, a subscription application form, etc., which is a form document that a user has frequently used, is received from the external device 200 and stored in the image forming apparatus 100, the control unit 120 may load the user form document to print the user form document.

When the data regarding the user form document is the information regarding the location at which the user form document is stored, the control unit 120 loads the user form document by receiving it from the outside, based on the information regarding the location in which the user form document is stored (operation S1020). That is, when either information regarding a document storage path of the external device 200 that may communicate with the image forming apparatus 100 or the information regarding the location at which the user form document is stored, such as a URL of a network linked to the image forming apparatus 100, is received from the external device 200 and stored in the image forming apparatus 100, the user form document may be loaded by receiving the user form document from the outside based on the received information. Since the control unit 120 cannot directly load the user form document to the image forming apparatus 100, the user form document may be loaded by requesting the location at which the user form document 20 is stored via the network interface 110 to transmit the user form document and then receiving the user form document.

When the user form document 20 is loaded, the control unit 120 may load some content of the user form document 20 by using information generated in the image forming apparatus 100. For example, the information generated in the image forming apparatus 100 may be time information generated from an RTC. When time information is included in the user form document 20, the control unit 120 may load the content together with the user form document 20 based on the time information when the user form document 20 is loaded.

Then, the image forming apparatus 100 prints the loaded user form document 20 using the print engine 150 (operation S840).

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors and/or by one or more processing elements. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

As described above, according to the one or more of the above embodiments, a user form document that a user has frequently used may be easily printed by manipulating an existing user interface for printing a test page, thereby increasing user's convenience.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A method by an image forming apparatus including a user interface and a memory having a test page storing space defined in the memory, the test page storing space storing data for a test page, the test page printable using the data for the test page in the test page storing space by a command to print the test page via the user interface, the method comprising:
receiving, from an external device, data for a user form document selected by a user;
replacing the data for the test page stored in the test page storing space defined in the memory with the received data for the user form document, to store the data for the user form document in the test page storing space;
in response to receiving the command to print the test page via the user interface included in the image forming apparatus, loading the user form document using the data for the user form document stored in the test page storing space; and
printing the loaded user form document.

2. The method of claim 1, wherein the data for the user form document is either the user form document or information for a location at which the user form document is stored.

3. The method of claim 2, wherein, when the data for the user form document stored in the test page storing space in the memory of the image forming apparatus is the user form document, the loading the user form document comprises loading the user form document stored in the test page storing space in the memory.

4. The method of claim 2, wherein, when the data for the user form document stored in the image forming apparatus is the information for the location at which the user form document is stored outside of the image forming apparatus, the loading the user form document comprises loading the user form document by receiving the user form document from the outside of the image forming apparatus, based on the information for the location at which the user form document is stored.

5. The method of claim 4, wherein the information for the location at which the user form document is stored is either a document storage path of the external device capable of establishing communication with the image forming apparatus or a uniform resource locator of a network linked to the image forming apparatus.

6. The method of claim 1, wherein the replacing of the data for the user form document in the image forming apparatus includes authenticating a user based on user information,
wherein, when the authenticating of the user succeeds, the data for the user form document replaces the data for the test page in the image forming apparatus.

7. The method of claim 1, wherein the data for the user form document is periodically received from the outside.

8. The method of claim 1, wherein the loading of the user form document includes loading a portion of content of the user form document based on information generated in the image forming apparatus.

9. At least one non-transitory computer readable medium storing computer readable instructions, which, when executed, controls at least one processor to implement the method of claim 1.

10. An image forming apparatus comprising:
a memory having a test page storing space defined in the memory, the test page storing space storing data for a test page, the test page printable using the data for the test page stored in the test page storing space by a command to print the test page;
a user interface on the image forming apparatus to receive the command to print the test page; and
a network interface to receive, from an external device, data for a user form document selected by a user;
a controller to:
in response to the network interface receiving the data for the user form document, replace the stored data for the test page in the test page storing space defined in the memory with the received data for the user form document, to store the data for the user form document in the test page storing space;
in response to the user interface receiving the command to print the test page via the user interface,
load the user form document using the data for the user form document stored in the test page storing space; and
print the loaded user form document.

11. The image forming apparatus of claim 10, wherein the data for the user form document is either the user form document or information for a location at which the user form document is stored.

12. The image forming apparatus of claim 11, wherein, when the data for the user form document stored in the memory is the user form document, the controller loads the user form document stored in the memory.

13. The image forming apparatus of claim 11, wherein, when the data for the user form document stored in the memory is the information for the location at which the user form document is stored outside of the image forming apparatus, the controller loads the user form document from the outside of the image forming apparatus, based on the information for the location at which the user form document is stored.

14. The image forming apparatus of claim 13, wherein the information for the location at which the user form document is stored is either a document storage path of the external device capable of establishing communication with the image forming apparatus or a uniform resource locator of a network linked to the image forming apparatus.

15. The image forming apparatus of claim 10, further comprising a user authenticator to authenticate a user based on user information, wherein, when the authentication of the user succeeds, the memory stores the received data for the user form document.

16. The image forming apparatus of claim 10, wherein the data for the user form document is periodically received from the outside via the network interface.

17. The image forming apparatus of claim 10, wherein the controller loads a portion of content of the user form document based on information generated in the image forming apparatus.

18. The image forming apparatus of claim 17, wherein the information generated in the image forming apparatus is generated by a real time clock.

* * * * *